(12) United States Patent
Windridge et al.

(10) Patent No.: US 7,311,770 B2
(45) Date of Patent: Dec. 25, 2007

(54) GRANULATED HYDROPHOBIC ADDITIVE FOR GYPSUM COMPOSITIONS

(75) Inventors: James Windridge, Birmingham (GB); Frederic Gubbels, Houtain le Val (BE); Derek Butler, Barry (GB); Manfred Wehner, Geisenheim (DE)

(73) Assignee: Dow Corning Corporation, Midland, MI (US)

( * ) Notice: Subject to any disclaimer, the term of this patent is extended or adjusted under 35 U.S.C. 154(b) by 354 days.

(21) Appl. No.: 10/398,327

(22) PCT Filed: Sep. 20, 2001

(86) PCT No.: PCT/GB01/04198

§ 371 (c)(1),
(2), (4) Date: Oct. 8, 2003

(87) PCT Pub. No.: WO02/30847

PCT Pub. Date: Apr. 18, 2002

(65) Prior Publication Data
US 2004/0050287 A1    Mar. 18, 2004

(30) Foreign Application Priority Data
Oct. 7, 2000   (GB) ................ 0024642.1

(51) Int. Cl.
*C04B 11/00* (2006.01)
(52) U.S. Cl. .............. 106/781; 106/665; 106/801; 106/806; 524/267
(58) Field of Classification Search .......... 106/781, 106/665, 801, 806; 524/267
See application file for complete search history.

(56) References Cited

U.S. PATENT DOCUMENTS

| 3,455,710 | A | * | 7/1969 | Nitzsche et al. ............. 106/781 |
|---|---|---|---|---|
| 4,092,441 | A | * | 5/1978 | Meyer et al. ................ 427/453 |
| 4,643,771 | A | | 2/1987 | Steinbach et al. |
| 4,704,416 | A | | 11/1987 | Eck et al. |
| 4,851,047 | A | * | 7/1989 | Demlehner et al. ............ 524/4 |
| 4,880,898 | A | * | 11/1989 | Wahle et al. ................ 528/272 |
| 4,975,122 | A | * | 12/1990 | Parkinson et al. .......... 106/727 |
| 5,336,715 | A | | 8/1994 | Sejpka et al. |
| 5,747,561 | A | * | 5/1998 | Smirnov et al. ............. 523/212 |
| 5,766,323 | A | * | 6/1998 | Butler et al. ..................... 106/2 |
| 6,020,403 | A | * | 2/2000 | Eck et al. .................... 523/340 |
| 6,106,607 | A | * | 8/2000 | Be et al. ..................... 106/781 |
| 6,268,423 | B1 | | 7/2001 | Mayer et al. |
| 6,323,268 | B1 | * | 11/2001 | Fisher et al. ................ 524/266 |

FOREIGN PATENT DOCUMENTS

| EP | 0067074 | 2/1982 |
|---|---|---|
| EP | 0496510 | 7/1992 |
| EP | 0811584 | 12/1997 |
| EP | 0919526 | 10/1998 |
| FR | 2692587 | 6/1993 |
| FR | 2776655 | 3/1998 |
| GB | 782111 | 9/1957 |
| GB | 1217813 | 12/1970 |
| GB | 2062607 | 5/1981 |
| WO | 9928264 | 6/1999 |
| WO | 0149789 | 7/2001 |

* cited by examiner

*Primary Examiner*—Margaret G. Moore
(74) *Attorney, Agent, or Firm*—Howard & Howard Attorneys, P.C.

(57) ABSTRACT

A hydrophobic gypsum composition is provided which contains gypsum, a granulated hydrophobing additive and a pH effecting additive in an amount sufficient to maintain the pH of the composition in the range of 8 and 12.5, in the presence of water. The granule contains an organopolysiloxane having silicon bonded hydrogen, a water soluble or water dispersible binder, and a carrier, preferably gypsum or a stearate salt, in an amount sufficient to hydrophobe the gypsum. The pH effecting additive is preferably lime but may be any appropriate additive.

21 Claims, No Drawings

GRANULATED HYDROPHOBIC ADDITIVE FOR GYPSUM COMPOSITIONS

FIELD OF INVENTION

The present invention relates to hydrophobic gypsum and to a process for making gypsum hydrophobic, in particular it relates to a granulated hydrophobing additive, a hydrophobic gypsum composition and method for preparing same using granules containing organosilicon compounds as hydrophobing additives.

BACKGROUND OF THE INVENTION

Water-resistance is considered to be an important factor in the production of building products containing gypsum, for example plasterboard, gypsum blocks, and mouldings. Adsorption of water can cause staining, mildew, expansion, and general deterioration and degradation of gypsum products. It is particularly difficult to provide gypsum products which may be utilised on external walls, due to the effects of the weather. Various techniques have been proposed to render gypsum products more hydrophobic, for example by way of surface treatment with a hydrophobing agent, i.e. spraying, brushing or rolling a hydrophobing agent onto a gypsum based substrate, by immersing the substrate in a solution of hydrophobing agent, or by admixing a hydrophobing agent into gypsum powder prior to formation of a gypsum based product, for example prior to moulding blocks or forming boards.

Surface treatment using a hydrophobing agent is a convenient means of increasing the water repellency of a pre-formed substrate, such as a pre-moulded gypsum block or plasterboard. However, after such a treatment the hydrophobing agent tends to be only dispersed in the surface layers of the substrate with the bulk of the substrate material remaining substantially untreated.

EP0592206 describes a method of preparing a water repellent gypsum board by applying a composition comprising water, a surfactant, an Si—H containing siloxane and a high molecular weight silicone.

An alternative method for rendering a substrate water repellent is to admix a hydrophobing agent into substrate material, such as gypsum powder, prior to moulding blocks or forming boards or the like. GB 1581396 describes a water resistant gypsum composition, which was thought to be useful for external applications. The composition was prepared by mixing a methyl hydrogen organopolysiloxane with powdered gypsum and optionally a setting retarder and a thickening agent. The methyl hydrogen organopolysiloxane was mixed into the gypsum in the absence of water and subsequently the required amount of water was added to the resulting mixture. GB 2062607 describes the manufacture of a gypsum-hardened body from a mixed material comprising gypsum, slag and a powdered additive coated with hydrophobic diorganopolysiloxane. U.S. Pat. No. 4,643,771 describes the production of water repellent plaster moulding by forming a foam of water, surfactant and polyalkylhydrogensiloxane, adding the foam to a water paste of plaster powder and allowing the mixture to set. U.S. Pat. No. 4,851,047 discloses a process for preparing water repellent articles from gypsum powder containing hydrophobic agents in which the hydrophobic agents are prepared by spray drying a mixture containing water, organopolysiloxane and a water soluble, film forming, polymer. U.S. Pat. No. 5,336,715 discloses water dilutable organopolysiloxane compositions for use as hydrophobing agents for materials such as concrete, gypsum and paint, which comprises a salt of a water-soluble organic or inorganic acid, an organopolysiloxane having at least one SiC-bonded organic radical containing basic nitrogen, and an alkoxylated alcohol. U.S. Pat. No. 4,704,416, describes aqueous redispersible powders obtained by spray drying an aqueous mixture of a water soluble polymer and at least one organic silicon polymer said powders are said to be utilisable for rendering bulk materials hydrophobic when diluted with water.

It has been considered for a long time by the building trade that while products containing a high proportion of gypsum are suitable for internal building their use in external masonry and rendering products is unacceptable due to the water absorbent properties of gypsum. One reason for this is that whilst the pre-mixing of a hydrophobing additive with gypsum, in the absence of water, results in a substantially uniform dispersion of hydrophobing additive throughout the mixture, upon the introduction of water the hydrophobing agent tends to migrate away from the water towards the gypsum air interface resulting in a concentration of hydrophobic agent on the outer surface of a gypsum block, i.e. at the interface with air. This migration effect results in the presence of very little hydrophobing agent in the inner body of blocks of gypsum and as such it has previously proved very difficult, if not impossible to maintain a uniform dispersion of hydrophobing additive throughout a gypsum block, subsequent to wetting. There still remains a long felt need to be able to make gypsum sufficiently hydrophobic in order for it be used in external wall applications.

DETAILED DESCRIPTION OF THE INVENTION

In accordance with a first aspect of the present invention there is provided a granulated hydrophobing additive comprising an organopolysiloxane, a water soluble or water dispersible binder, and a carrier, said organopolysiloxane having the formula:

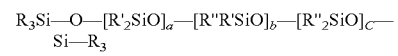

wherein each R substituent may be the same or different and is selected from the group of hydroxyl, alkyl, alkenyl, aryl, alkyl-aryl, aryl-alkyl, alkoxy, aryloxy and hydrogen, each R' substituent may be the same or different and is selected from the group of hydroxyl, hydrogen, a hydrocarbon group or substituted hydrocarbon group, OR''' where R''' is a hydrocarbon group with 1 to 6 carbon atoms, each R'' substituent is an organopolysiloxane chain of the formula O—[R'$_2$SiO]$_x$—SiR$_3$; a is an integer, b, c and x are zero or integers whereby the total of b+c is no more than 10% of the total of a+b+c+x and at least 10% of the cumulative total of R+R' substituents are hydrogen.

It is to be understood that the concept of "comprising" where used herein is used in its widest sense to mean and to encompass the notions of "include", "comprehend" and "consist of".

The organopolysiloxane component of the hydrophobing additive has the general formula

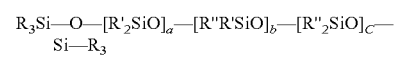

wherein each R substituent is the same or different and is selected from the group of hydroxyl, an alkyl group, alkenyl, aryl, alkyl-aryl, aryl-alkyl, alkoxy, aryloxy and hydrogen, but is preferably an alkyl group having 1 to 6 carbon atoms or hydrogen and most preferably each R group is a methyl or ethyl group.

Each R' substituent may be the same or different and is selected from the group of hydroxyl, hydrogen, a hydrocarbon group or substituted hydrocarbon group, such as an alkyl group, alkenyl, aryl, alkyl-aryl, aryl-alkyl, aryloxy or an alkoxy group OR''' where R''' is a hydrocarbon group with 1 to 6 carbon atoms. Most preferably each R' substituent is hydrogen or an alkyl group having 1 to 12 carbon atoms. Each R'' substituent is an organopolysiloxane chain of the formula:

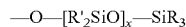

where R' and R are as described above. At least 10% of the cumulative total of R+R' substituents are hydrogen, preferably at least 10% of R' substituents groups are hydrogen. Most preferably up to about 50% of R' substituents will be hydrogen and the remaining R' substituents will be alkyl groups having from 1 to 12 carbon atoms most preferably methyl or ethyl groups.

As indicated above, while it is preferred that the majority of siloxane units are di-functional siloxane units, tri-functional or tetra-functional units may also be present resulting in a certain amount of branching. Although resinous organopolysiloxane materials may be used in a granule in accordance with the composition of this invention, it is preferred that the tri-functional or tetra-functional siloxane units should not exceed 10% more preferably 5% of the total number of siloxane units in the polymer, thereby limiting the amount of branching. More preferably no more than about 1% tri-functional or tetra-functional siloxane units are present in the organopolysiloxane. Hence the total of b+c is no more than 10%, and more preferably no more than 5% of the total of a+b+c+x, where a is an integer, b, c and x are zero or integers. Most preferably the total of b+c is zero.

Preferably the organopolysiloxane material has a viscosity of from 10 to about 60,000 mm$^2$/s at 25° C. More preferably the viscosity of the organopolysiloxane material should not exceed about 5,000 mm$^2$/s at 25° C.

The water-soluble or water-dispersible binder material is preferably a material or mixture of materials which at room temperature, i.e. from 20 to 25° C., has/have a waxy, highly viscous or solid consistency and a melting point of from 25 to 150° C. Examples of suitable water-soluble or water-dispersible binder materials include polyvinyl alcohol, methyl cellulose, carboxy methyl cellulose, ethoxylated fatty alcohols and mixtures thereof with fatty acids, fatty acid esters and other film forming polymers. It is preferred that the binder material is water soluble. Most preferably the water solubility should be such that it does not interfere with the hydration process of the gypsum when water is introduced prior to its application or use. Preferred binders contain ethoxylated fatty alcohol based waxes and the most preferred binders are ethoxylated fatty alcohol wax/$C_{16-20}$ fatty acid mixtures. This is because it has been found that the incorporation of, for example, stearic acid or the like in appropriate amounts, results in the control of the rate of solubility of the organopolysiloxane component in water, when set, gypsum based products are wetted and as such is therefore a means of controlling the rate of release of the encapsulated organopolysiloxane component from the granules. The preferred fatty acid is stearic acid. The ethoxylated fatty alcohol wax/stearic acid mixtures comprise from 10 to 90% by weight of each constituent. At least 10% by weight of the wax must be present in a mixture of this type as stearic acid alone is insoluble in water. Preferably the binder comprises from 35 to 85% by weight of ethoxylated fatty alcohol wax, the remainder being stearic acid. An example of a preferred ethoxylated fatty alcohol wax is Lutensol® AT 80 from BASF and a preferred ethoxylated fatty alcohol wax/fatty acid mixture is Emulan® 40/60 which is a 40/60 mixture of ethoxylated fatty alcohol wax and $C_{16-22}$ fatty acids (substantially stearic acid).

The carrier particles may be any appropriate water-soluble, water-insoluble or water-dispersible particles. Preferred carrier particles include gypsum, calcium sulphate formed in flue gas desulphurisation, magnesium sulphate or barium sulphate starch, native starch, methyl cellulose, carboxy methyl cellulose, sand, silica, alumino silicates, clay materials, calcium carbonates, polystyrene beads, ammonium stearate or metal stearate salts and polyacrylate beads. Most preferred carrier particles are gypsum and metal stearate salts, in particular alkali metal and alkaline earth metal stearate salts. Alkali metal and alkaline-earth metal stearate salts are well known hydrophobing agents and may enhance the hydrophobic nature of the granule, examples include sodium stearate, lithium stearate, potassium stearate, magnesium stearate, calcium stearate, barium stearate, zinc stearate, aluminium tri stearate, aluminium-di-stearate, aluminium mono stearate, copper stearate, of these zinc stearate and calcium stearate are preferred.

The carrier particles may have a diameter of from 10 to 1000 μm, most preferably 20 to 100 μm. Although on the one hand it is preferred to use materials, which fulfil a useful role in, for example, gypsum based compositions, it has been found that water-soluble carrier particles have particularly interesting effects, even if they are not per se active materials in such compositions. Furthermore, it is preferred that the granules preferably have a maximum diameter of 1.4 mm.

It is preferred that the granulated hydrophobing additive comprises from 5 to 30% by weight, preferably 8 to 15% by weight of the organopolysiloxane containing Silicon bonded hydrogen, from 10 to 45%, more preferably 15 to 30% by weight of the binder and from 50 to 85%, more preferably 60 to 80% by weight of the carrier. It is also preferred that the organopolysiloxane containing Si bonded hydrogen and binder together comprise from 20 to 40% by weight of the total weight of the granulated hydrophobing additive.

From 0 to 1.8 weight % of the granule may comprise one or more catalysts suitable for catalysing the interaction between the water and organopolysiloxane. Any appropriate catalyst for catalysing such a reaction may be included in the granule provided there is no reaction with the organopolysiloxane prior to the introduction of water to the powder/granule mixture examples include transition metal catalysts such as organo-metallic titanium and zirconium catalysts, for example tetra-isopropoxy titanate, tetrabutylorthotitanate, tetra tert butoxy titanate, tetra isopropoxy titanate, triethanolamine titanates and catalysts described WO 01/49789.

Further additional ingredients may be included in the granulated hydrophobing additive. These may include dispersing agents, organic hydrophobing agents, viscosity modifiers, surfactants, pigments, colorants, preservatives, gelling agents, accelerators, retarders, air entrainers and fillers, e.g. silica and titanium dioxide. It is however preferred that these latter optional ingredients do not comprise more than 5% by weight of the total weight of the granulated hydrophobing additive.

It is essential that the hydrophobing additive is granulated, which means that it was prepared by a granulation process. In a granulation process the organopolysiloxane containing silicon bonded hydrogen and the water-soluble or water-dispersible binder are deposited in their liquid form onto carrier particles thus forming a free flowing solid powder. The granulation methods have been described in a number of patent specifications, including EP 0811584 and EP 0496510 and is further detailed below.

The granulation process ensures that the organopolysiloxane and the binder material are contacted in their liquid phase and a mixture of the organopolysiloxane and the binder are deposited onto the carrier. It is possible to prepare a mixture of the binder and organopolysiloxane containing Si bonded hydrogen beforehand, e.g. by mere mixing of the materials or by causing them to be admixed in the presence of adjuvants such as stabilising agents or solvents. Conventional procedures for making powders are particularly convenient e.g. granulation and fluid bed coating procedures, both being comprised in the definition of granulation as used herein. For example the binder material in liquid form (e.g. achieved through heating of the material where necessary), and the organopolysiloxane in liquid form (where needed by admixture with small amounts of solvent), may be passed into a tower and permitted to form the hydrophobing additive by depositing the carrier particles, e.g. native starch onto a mixture of said organopolysiloxane material and said binder material.

In one method the organopolysiloxane material and the binder material are sprayed simultaneously onto a fluidised bed. Upon spraying small liquid droplets are formed containing the organopolysiloxane and the binder material. The droplets are usually heated, as the binder material is to be in liquid form. The droplets then cool down as they make their way onto the bed. Thus they solidify, forming a particulate finely divided hydrophobing additive, which is then deposited onto the carrier particle. The organopolysiloxane containing Si bonded hydrogen and the binder may be mixed prior to spraying, or by contacting the sprayed liquid droplets of both materials, for example by spraying the materials via separate nozzles. Solidification of the droplets which then contain both materials in liquid form, may be encouraged, for example by use of a cool air counter stream, thus reducing more quickly the temperature of the droplets. Alternatively solidification may be encouraged by the use of air counter current to aid evaporation of any solvent present. Other ways of encouraging solidification will be clear to the person skilled in the art. Total solidification does preferably not take place prior to the mixture being deposited onto the carrier particle. The finely divided granulated hydrophobing additive is then collected at the bottom of the tower.

In another method the organopolysiloxane material and binder material are sprayed simultaneously into a drum mixer containing the carrier. On spraying small liquid droplets are formed containing the organopolysiloxane material and the binder material. The droplets partially cool down on contact with the carrier particles. After mixing is complete the partially cooled particles are transferred to a fluidised bed where cooling is completed with ambient air. The finely divided particles of granulated hydrophobing additive are then collected directly from the fluidised bed. Optionally the particles may be further screened by sieving to produce particles of hydrophobing additive substantially free of any undersized or oversized material. A typical apparatus which is useful for the method of the invention is the Eirich® pan granulator, the Schugi® mixer, the Paxeson-Kelly® twin-core blender, the Lödige® ploughshare mixer or one of the numerous types of fluidised bed apparatuses, e.g. Aeromatic® fluidised bed granulator.

In a second aspect of the invention there is provided a gypsum composition comprising the following components
  i) gypsum;
  ii) a granulated hydrophobing additive comprising an organopolysiloxane containing Si bonded hydrogen, a water soluble or water dispersible binder, and a carrier; and a pH effecting additive in an amount sufficient to maintain the pH of the composition between 8 and 12.5 in the presence of water.

The gypsum in component (i) may be any form of gypsum, i.e. hydrated calcium sulphate suitable for use for building purposes and may further include organic (for example cellulosic or paper) or mineral/glass fibres in admixture to modify its physical properties, or any other additive common to gypsum formulations.

Component (ii), the granulated hydrophobing additive preferably comprises a water soluble or water dispersible binder, and a carrier both as described hereinbefore. The organopolysiloxane of component (ii) may be any suitable organopolysiloxane containing silicon bonded hydrogen, i.e. materials which are based on an Si—O—Si polymer chain and which may comprise mono-functional, di-functional, tri-functional and/or tetra-functional siloxane units. It is preferred that the majority of siloxane units are di-functional materials having the general formula —[R'$_2$SiO]— wherein each R' substituent may be the same or different and is as described above. Preferably each R' substituent will be selected from the group of alkyl groups, alkenyl groups, aryl groups, alkyl-aryl groups, aryl-alkyl groups, alkoxy groups, aryloxy groups and hydrogen. Preferably about 10%, more preferably up to about 50% of R' substituents will be hydrogen and the remaining R' substituents will be alkyl groups having from 1 to 12 carbon atoms most preferably methyl or ethyl groups.

While it is preferred that the majority of siloxane units are di-functional siloxane units, tri-functional or tetra-functional units may also be present resulting in a certain amount of branching. Although resinous organopolysiloxane materials may be used in a granule in accordance with the composition of this invention, it is preferred that the tri-functional or tetra-functional siloxane units should not exceed 10% of the total number of siloxane units in the polymer, thereby limiting the amount of branching. More preferably no more than about 1% tri-functional or tetra-functional siloxane units are present in the organopolysiloxane. In addition to the potential branching units there will also be present a number of mono-functional siloxane units. These will be used as end-capping or end-blocking units in the organopolysiloxane and will preferably have the formula -$_{1/2}$SiR$_3$ wherein each R is the same or different and is as described above. Hence, preferably the organopolysiloxane component of the hydrophobing additive has the general formula

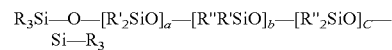

wherein R, R', R", a, b and c are all as described above.

Component (iii), the pH effecting additive, may be any appropriate additive which can maintain the pH of a wet gypsum system between pH 8 and 12.5, most preferably between pH 10 and 12.5. It was determined if the pH fell outside this range significantly poorer hydrophobicity was observed. The pH effecting additive may be an aqueous solution such as an appropriate buffer solution, which can be added prior to concurrent with or subsequent to water. However, the preferred pH effecting additive is a water soluble inorganic powder, which can be mixed into the gypsum when dry. A preferred pH effecting additive is hydrated lime (calcium hydroxide) which hereafter will be referred to as lime. Lime is particularly preferred as it is often present as an additive in commercial gypsum compositions, in which case providing the resulting pH of the gypsum composition falls within the range defined hereabove no additional pH effecting additive is required to be added. However, it is preferred not to incorporate the pH effecting additive, for example the water soluble inorganic powder, in the granule matrix or to prepare a premix comprising the pH effecting additive and the granules in order to ensure that reaction between the organopolysiloxane and water does not occur prematurely.

The introduction of a granule in accordance with the composition of the invention into gypsum formulations provides significant advantages over the prior art, in that, as the hydrophobing agent is substantially encapsulated within a granule, it is not able to immediately create a hydrophobic effect upon the introduction of water into a dry gypsum/granule mixture, leading to a substantially even dispersion of hydrophobing additive throughout the resulting gypsum block. Another advantage of the granule in accordance with the composition of the present invention is that the active hydrophobing agent is protected against the effects of oxygen and water during storage.

In one embodiment of the present invention there is a combination of small granules and large granules mixed into the gypsum powder such that upon the first introduction of water to the powder mixture hydrophobing organopolysiloxane significantly from the small granules is released as the small granules dissolve and only a proportion of the hydrophobing organopolysiloxane is released from the larger granules such that future wetting of the gypsum based product will lead to an increasingly hydrophobic gypsum product as the larger granules dissolve thereby releasing the remaining hydrophobing organopolysiloxane.

The granulated hydrophobing agent as described herein may be used to hydrophobe any form of gypsum such as plasterboard and the like however, it is thought to be particularly useful in hydrophobing gypsum for external applications such as for masonry and rendering products.

In a third aspect of the invention, there is provided a process of imparting to gypsum a hydrophobing character by mixing into the gypsum a hydrophobing additive as described above. Mixing may be done by mechanical means or any other appropriate method known in the art.

EXAMPLES

There now follows a number of examples to illustrate the invention. All parts and percentages are given by weight unless otherwise indicated.

Example 1

1a) Preparation of Granulated Hydrophobing Additive 90 g of a 4/1 mixture by weight of an ethoxylated fatty alcohol wax and $C_{16-20}$ fatty acids mixtures was melted in a beaker at a temperature of about 65° C. 60 g of a trimethylsiloxy terminated methylhydrogenpolysiloxane with a viscosity of 20 mm²/s at room temperature was heated to a temperature of 60° C. and added to the melted wax/fatty acid mixture and the resulting dispersion was then mixed with a hand blender for two minutes. 500 g of gypsum powder was introduced into a food processor and was mixed at full speed. The hot organopolysiloxane/wax/fatty acid mixture was then poured over the gypsum during a 10 to 15 second period whilst the food processor was maintained at full speed and the resulting mixture was stirred until all the wax/organopolysiloxane mixture had been absorbed by the gypsum, dried and stored. The resulting mixture was left to cool for a period of about 1 hour and the resulting cooled granules were sieved.

In cases where a condensation catalyst such as triethanolamine titanate was present in the composition, this was added to the hot wax/fatty acid mixture prior to introduction of the organopolysiloxane.

The dried granulated product may be added to gypsum powder immediately prior to the preparation of gypsum product samples or at any other time prior to the formation of the gypsum product. In cases where a soluble inorganic powder, usually lime, is present the lime and granules were mixed into the gypsum powder separately to decrease the probability of interaction between the organopolysiloxane and lime.

1b) Preparation of the Powdered Gypsum Materials and Sample Blocks 20 g of granules in accordance with the invention and 2 g of powdered lime were dry mixed into 380 g of gypsum powder. Sample blocks were prepared by the addition of 260 g of water into the dry powder mixture after which mixtures were blended together with a hand blender for 1 minute or until homogenous and the resulting mixture was poured into a mould having dimensions of 100×100×25 mm and left to set for 20 minutes. The resulting sample block was demoulded and left to dry for a further seven day period at room temperature under atmospheric conditions prior to testing The resulting product samples were then each tested as indicated below. Comparative blank sample blocks were prepared by the method described above without the addition of the granule.

Example 2

Each sample block prepared was analysed for water pick up (WPU). The gypsum used in all test samples was a hemi hydrated calcium sulphate, commonly known in the industry as stucco gypsum. The steps carried out in the test were as follows. Each dry block was weighed to provide an initial weight WI. The blocks were then submerged in water with a 5 cm head of water to provide a constant hydrostatic pressure. The blocks remained submerged for a period of two hours before being reweighed (Wt) and WPU was determined on the basis of the following equation:

$$WPU\ (\%) = \frac{Wt - WI \times 100}{WI}$$

The granules used in the test described above were prepared as described in Example 1 above and are identified below in Table 2a. Unless otherwise indicated the organopolysiloxane used was a trimethylsiloxy terminated methylhydrogenpolysiloxane (TMSMHPS) with a viscosity of 20 mm²/s at room temperature and unless otherwise indicated the wax is a 4/1 mixture by weight of an ethoxylated fatty alcohol wax and $C_{16-20}$ fatty acids (4/1). The numbers in brackets are the amounts of each constituent in the granule composition in grams.

TABLE 2a

Granule Composition

| Granule | Carrier | Organopolysiloxane | Wax |
|---|---|---|---|
| A | Stucco (500) | TMSMHPS (40) | 4/1 (110) |
| B | Stucco (500) | TMSMHPS (60) | 4/1 (90) |
| C | Stucco (500) | TMSMHPS (80) | 4/1 (70) |
| D | Stucco (500) | TMSMHPS (60) | Lutensol ® AT 80 (90) |
| E | Zn Stearate (500) | TMSMHPS (60) | 4/1 (90) |
| F | Sand (500) | TMSMHPS(60) | 4/1 (90) |
| G | Calcium carbonate (500) | TMSMHPS (60) | 4/1 (90) |
| H | Stucco (500) | Trimethylsiloxy terminated polydimethylsiloxane (viscosity 20 mm²/s) (60) | 4/1 (90) |

WPU test results for the different granules identified above are tabulated in Table 2b. Comparative samples are identified with a C before the sample block number.

TABLE 2b

WPU Test Results

| Sample Block | Granule | Wt % | PH additive | Wt % | WPU (2 hr) | WPU (24 hr) |
|---|---|---|---|---|---|---|
| C1 | None | — | None | — | 33.1 | 35.8 |
| C2 | None | — | Lime | 1 | 33.8 | 35.2 |
| 3 | A | 5 | Lime | 1 | 18.5 | 22.5 |
| 4 | B | 5 | Lime | 1 | 6.8 | 11.4 |
| 5 | C | 5 | Lime | 1 | 12.0 | 15.0 |
| 6 | D | 5 | Lime | 1 | 13.9 | 17.4 |
| 7 | E | 5 | Lime | 1 | 8.96 | 17.64 |
| 8 | F | 5 | Lime | 1 | 21.5 | 27.2 |
| 9 | G | 5 | Lime | 1 | 19.8 | 22.9 |
| C10 | H | 5 | Lime | 1 | 32.8 | 34.8 |

Example 3

The following test results were obtained by the undertaking of identical tests to those undertaken in Example 2 using 5% by weight of granule B and varying the pH of the gypsum upon addition of water to determine the optimum pH range. All alkali and Buffer solutions were introduced into the system concurrent with water.

TABLE 3 pH Relationship Results

| Sample Block | pH buffer | 2 hr WPU | 24 hr WPU |
|---|---|---|---|
| 11 | PH 8 buffer | 14.1 | 28.1 |
| 12 | PH 9 buffer | 6.5 | 11.5 |
| 13 | PH 10 buffer | 8.0 | 14.9 |
| 14 | PH 11 buffer | 4.7 | 7.4 |
| 15 | PH 12 buffer | 3.7 | 5.3 |
| C16 | KOH (pH 13) | 33.1 | 34.6 |

Example 4

This example follows the test criteria of standard German test DIN 52 617 which relates to water repellency of cement based external plaster. In this case an example is given using the stucco gypsum previously used as well as with a number of examples using a readily available gypsum known as Blue Hawk and sold by British Gypsum, which upon testing was found to have a pH of approximately 12 and as such no additional pH effecting additive was required for the Blue Hawk gypsum.

Test pieces were prepared as prescribed by the DIN 52 617 test. Sample block 18 was the same in composition as sample block 4 above. Sample blocks C19 to 21 contained Blue Hawk gypsum (BH). Once each sample was prepared and allowed to dry the following tests were undertaken.

The initial weight of each pre-prepared test piece was determined, the edges of the blocks were sealed with molten paraffin wax and the test piece was re-weighed prior to being placed in a plastic tray in accordance with the test protocol. Water was introduced into the tray until the level was about one third of the way up the block so that water can only ingress into the test piece through a single face of the piece. Each test piece was reweighed after 1, 6 and 24 hours and the results can be seen below in Table 4, in which all percentage values given are % by weight and the catalyst used in sample block 19 was a triethanolamine titanate catalyst.

TABLE 4

DIN 52 617 Results

| Sample block | Sample under test | Initial dry wt (av.) | 1 hour (kg/m²/hr$^{0.5}$) | 4 hours (kg/m²/hr$^{0.5}$) | 24 hours (kg/m²/hr$^{0.5}$) |
|---|---|---|---|---|---|
| 17 (=4) | Stucco + 5% granule B + 1% lime | 360.2 | 0.10 | 0.06 | 0.05 |
| C18 | BH | 362.2 | 5.32 | 2.24 | 1.16 |
| 19 | BH + 5% granule B + 2 ml catalyst | 274.1 | 0.1 | 0.04 | 0.02 |
| 20 | BH + 5% granule B | 277.2 | 0.11 | 0.05 | 0.02 |

It is to be noted that the sample blocks 17 and 20 gave very similar results and that the addition of the titanate catalyst in block 19 did not result in significant improvements in results.

Example 5

Gypsum is sparingly soluble in water (approx. 2.6 g/litre) and the following test was developed to determine whether or not the addition of hydrophobing granules in accordance with the current invention has an effect on the solubility of gypsum sample blocks. The results provided in Table 5 are based upon the amount of gypsum dissolved during a predetermined time period using an approximately constant flow rate of water. The sample blocks used were identical to C1 to 10 in Table 1b above. The initial weight (Wi) of each sample block was determined and the weighed sample blocks were arranged in a tray, such that each sample is covered with water, a wire mesh screen was added to prevent movement of the sample blocks during the experiment. Water was introduced into the tray at a rate of about 1 litre per minute for a period of 24 hours. Upon completion of the test each sample block was dried to a constant weight Wc that was recorded and the % weight loss values were determined using the following equation:

$$\frac{Wi - Wc \times 100}{Wi}$$

TABLE 5

Weight Loss Due to Running Water

| Sample Block | Granule | Wt % | PH additive | Wt % | % weight loss |
|---|---|---|---|---|---|
| C1 | None | — | None | — | 8.1 |
| C2 | None | — | Lime | 1 | 9.4 |
| 3 | A | 5 | Lime | 1 | 4.9 |
| 4 | B | 5 | Lime | 1 | 3.9 |
| 5 | C | 5 | Lime | 1 | 4.4 |
| 6 | D | 5 | Lime | 1 | 4.4 |
| 7 | E | 5 | Lime | 1 | 5.2 |
| 8 | F | 5 | Lime | 1 | 5.6 |
| 9 | G | 5 | Lime | 1 | 5.7 |

It will be noted that the weight loss of sample blocks in accordance with the present invention is approximately 40 to 60% of the comparative sample blocks and as such a significant improvement is observed.

The invention claimed is:

1. A granulated hydrophobing additive comprising:
from 5 to 30% by weight of an organopolysiloxane,
from 10 to 45% by weight of a binder material selected from the group consisting of:
(i) water soluble binders, and
(ii) water dispersible binders, and
from 50 to 85% by weight of a carrier,
the organopolysiloxane having the formula:

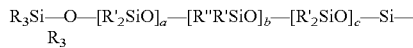

wherein each R substituent is selected from the group consisting of:
(i) a hydroxyl group,
(ii) an alkyl group,
(iii) an alkenyl group,
(iv) an aryl group,
(v) an alkaryl group,
(vi) aralkyl group,
(vii) an alkoxy group,
(viii) an aryloxy group, and
(ix) a hydrogen atom,
wherein each R' substituent may be the same or different and is selected from the group consisting of:
(a) a hydroxyl group,
(b) a hydrogen atom,
(c) a hydrocarbon group,
(d) a substituted hydrocarbon group, and
(e) an OR'" group
wherein R'" is a hydrocarbon group with 1 to 6 carbon atoms; each R" is an organopolysiloxane chain of the formula O—[R'$_2$SiO]$_x$SiR$_3$; a is an integer, b, c and x are zero or an integer; whereby the total of b+c is no more than 10% of the total of a+b+c+x and at least 10% of the cumulative total of R+R' substituents is hydrogen, and
wherein the organopolysiloxane and the binder material are deposited on the carrier.

2. An additive as claimed in claim 1 wherein the organopolysiloxane is a trialkylsiloxy terminated methylhydrogenpolysiloxane with a viscosity of from 10 to about 5000 mm$^2$/s at 25° C.

3. An additive as claimed in claim 1 comprising the water dispersible binder and wherein the water dispersible binder comprises an ethoxylated fatty alcohol.

4. An additive as claimed in claim 3 wherein the water dispersible binder is a mixture of an ethoxylated fatty alcohol and C$_{16-20}$ fatty acids.

5. An additive as claimed in claim 1 wherein the carrier is selected from the group consisting of gypsum, calcium sulphate formed in flue gas desulphurisation, magnesium sulphate, barium sulphate starch, native starch, methyl cellulose, carboxy methyl cellulose, sand, silica, alumino silicates, clay materials, calcium carbonates, polystyrene beads, ammonium stearate or metal stearate salts and polyacrylate beads.

6. An additive as claimed in claim 5 wherein the carrier is selected from the group consisting of gypsum, sodium stearate, lithium stearate, potassium stearate, magnesium stearate, calcium stearate, barium stearate, zinc stearate, aluminium tri stearate, aluminium distearate, aluminium monostearate, and copper stearate.

7. An additive as claimed in claim 1 wherein:
the organopolysiloxane comprises a trialkylsiloxy terminated methylhydrogenpolysiloxane with a viscosity of from 10 to about 5000 mm$^2$/s at 25° C.,
the binder material comprises an ethoxylated fatty alcohol; and
the carrier is selected from the group consisting of gypsum, sodium stearate, lithium stearate, potassium stearate, magnesium stearate, calcium stearate, barium stearate, zinc stearate, aluminium tri stearate, aluminium distearate, aluminium monostearate, copper stearate.

8. An additive as claimed in claim 1 wherein the organopolysiloxane containing silicon bonded hydrogen and binder together comprise from 20 to 40% by weight of the total weight of the granulated hydrophobing additive.

9. An additive as claimed in claim 1 wherein the organopolysiloxane and binder material are deposited in their liquid form onto the carrier.

10. An additive as claimed in claim 1 wherein the carrier comprises particles having a diameter of from 10 to 100 µm.

11. A granulated hydrophobing additive comprising:
an organopolysiloxane,
a binder material selected from the group consisting of:
(i) water soluble binders, and
(ii) water dispersible binders, and
a carrier comprising particles having a diameter of from 10 to 100 µm,
the organopolysiloxane having the formula:

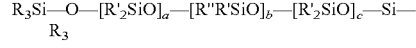

wherein each R substituent is selected from the group consisting of:
(i) a hydroxyl group,
(ii) an alkyl group,
(iii) an alkenyl group,
(iv) an aryl group,
(v) an alkaryl group,
(vi) aralkyl group,
(vii) an alkoxy group,
(viii) an aryloxy group, and
(ix) a hydrogen atom, wherein each R' substituent may be the same or different and is selected from the group consisting of:
(a) a hydroxyl group,
(b) a hydrogen atom,
(c) a hydrocarbon group,
(d) a substituted hydrocarbon group, and
(e) an OR''' group wherein R''' is a hydrocarbon group with 1 to 6 carbon atoms; each R'' is an organopolysiloxane chain of the formula $O-[R'_2SiO]_xSiR_3$; a is an integer, b, c and x are zero or an integer; whereby the total of b+c is no more than 10% of the total of a+b+c+x and at least 10% of the cumulative total of R+R' substituents is hydrogen, and wherein the organopolysiloxane and the binder material are deposited on the carrier.

12. An additive as claimed in claim 11 wherein the organopolysiloxane is a trialkylsiloxy terminated methylhydrogenpolysiloxane with a viscosity of from 10 to about 5000 mm²/s at 25° C.

13. An additive as claimed in claim 11 comprising the water dispersible binder and wherein the water dispersible binder comprises an ethoxylated fatty alcohol.

14. An additive as claimed in claim 13 wherein the water dispersible binder is a mixture of an ethoxylated fatty alcohol and $C_{16-20}$ fatty acids.

15. An additive as claimed in claim 11 wherein the carrier is selected from the group consisting of gypsum, calcium sulphate formed in flue gas desulphurisation, magnesium sulphate, barium sulphate starch, native starch, methyl cellulose, carboxy methyl cellulose, sand, silica, alumino silicates, clay materials, calcium carbonates, polystyrene beads, ammonium stearate or metal stearate salts and polyacrylate beads.

16. An additive as claimed in claim 15 wherein the carrier is selected from the group consisting of gypsum, sodium stearate, lithium stearate, potassium stearate, magnesium stearate, calcium stearate, barium stearate, zinc stearate, aluminium tri stearate, aluminium distearate, aluminium monostearate, and copper stearate.

17. An additive as claimed in claim 11 wherein:
the organopolysiloxane comprises a trialkylsiloxy terminated methylhydrogenpolysiloxane with a viscosity of from 10 to about 5000 mm²/s at 25° C.,
the binder material comprises an ethoxylated fatty alcohol; and
the carrier is selected from the group consisting of gypsum, sodium stearate, lithium stearate, potassium stearate, magnesium stearate, calcium stearate, barium stearate, zinc stearate, aluminium tri stearate, aluminium distearate, aluminium monostearate, copper stearate.

18. An additive as claimed in claim 11 wherein the organopolysiloxane containing silicon bonded hydrogen and binder together comprise from 20 to 40% by weight of the total weight of the granulated hydrophobing additive.

19. An additive as claimed in claim 11 wherein the organopolysiloxane and binder material are deposited in their liquid form onto the carrier.

20. A granulated hydrophobing additive comprising:
an organopolysiloxane,
a water dispersible binder comprising a mixture of an ethoxylated fatty alcohol and $C_{16-20}$ fatty acids, and
a carrier,
the organopolysiloxane having the formula:

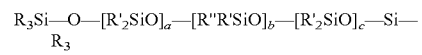

wherein each R substituent is selected from the group consisting of:
(i) a hydroxyl group,
(ii) an alkyl group,
(iii) an alkenyl group,
(iv) an aryl group,
(v) an alkaryl group,
(vi) aralkyl group,
(vii) an alkoxy group,
(viii) an aryloxy group, and
(ix) a hydrogen atom, wherein each R' substituent may be the same or different and is selected from the group consisting of:
(a) a hydroxyl group,
(b) a hydrogen atom,
(c) a hydrocarbon group,
(d) a substituted hydrocarbon group, and
(e) an OR''' group wherein R''' is a hydrocarbon group with 1 to 6 carbon atoms; each R'' is an organopolysiloxane chain of the formula $O-[R'_2SiO]_xSiR_3$; a is an integer, b, c and x are zero or an integer; whereby the total of b+c is no more than 10% of the total of a+b+c+x and at least 10% of the cumulative total of R+R' substituents is hydrogen, and wherein the organopolysiloxane and the binder material are deposited on the carrier.

21. A granulated hydrophobing additive comprising:
an organopolysiloxane,
a binder material selected from the group consisting of:
(i) water soluble binders, and
(ii) water dispersible binders, and
a carrier,
the organopolysiloxane having the formula:

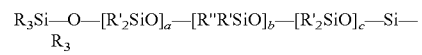

wherein each R substituent is selected from the group consisting of:
(i) a hydroxyl group,
(ii) an alkyl group,
(iii) an alkenyl group,
(iv) an aryl group,
(v) an alkaryl group,
(vi) aralkyl group,
(vii) an alkoxy group,
(viii) an aryloxy group, and
(ix) a hydrogen atom, wherein each R' substituent may be the same or different and is selected from the group consisting of:
(a) a hydroxyl group,
(b) a hydrogen atom,
(c) a hydrocarbon group,
(d) a substituted hydrocarbon group, and
(e) an OR''' group wherein R''' is a hydrocarbon group with 1 to 6 carbon atoms; each R'' is an organopolysiloxane chain of the formula $O-[R'_2SiO]_xSiR_3$; a is an integer, b, c and x are zero or an integer; whereby the total of b+c is no more than 10% of the total of a+b+c+x and at least 10% of the cumulative total of R+R' substituents is hydrogen, wherein the organopolysiloxane containing silicon bonded hydrogen and binder together comprise from 20 to 40% by weight of the total weight of the granulated hydrophobing additive, and wherein the organopolysiloxane and the binder material are deposited on the carrier.

* * * * *